Jan. 12, 1971 — J. E. WINTER — 3,555,440

DELAY-LINE FREQUENCY DISCRIMINATOR

Filed July 1, 1969 — 2 Sheets-Sheet 1

INVENTOR
JOHN E. WINTER
BY Charles P. S. Curry
ATTORNEY

United States Patent Office 3,555,440
Patented Jan. 12, 1971

3,555,440
DELAY-LINE FREQUENCY DISCRIMINATOR
John E. Winter, Los Altos, Calif., assignor, by mesne assignments, to the United States of America as represented by the Secretary of the Navy
Filed July 1, 1969, Ser. No. 838,175
Int. Cl. H03k 3/00
U.S. Cl. 329—116                                        8 Claims

ABSTRACT OF THE DISCLOSURE

A frequency discriminator for processing frequency modulated RF signals including a voltage limiter, four transmission lines connected at a junction, a square law detector and an AM receiver. One transmission line connects the output of the limiter to the junction, another transmission line connects the input of the square law detector to the junction and the other two transmission lines form a single delay line where each of these two transmission lines has one end connected to the junction and the other ends are connected to each other. In alternative embodiments the two transmission lines are formed into either two open ended or two shorted delay lines of equal length. Because of signal absorption and signal cancellation by the limiter, square law detector and delay lines a signal is applied to the input of the square law detector such that its output voltage will vary linearly as a function of the input frequency over a pre-selected range of frequencies.

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

Communication satellites provide a form of radio communication that generally operate in the higher frequency spectrum and often employ frequency modulation for transmitting intelligence. The transmitted signals from satellities, for example, will vary in frequency and amplitude. The variation is frequency represents the intelligence and the variation in amplitude is caused because the transmitter may be at varying distances from the receiver and because of variations in ionosphere propagation. In order to have mass communications with transmission signals of the type described it is desirable to have a receiving system that is very simple, reliable, low cost and uses existing AM receivers.

Accordingly, an object of the present invention is to provide a simple, reliable and low cost frequency discriminator that is capable of converting frequency modulated information into voltage amplitude modulated information. The frequency discriminator of the present invention will accept FM frequencies over a broad high frequency bandwidth and will convert them into AM signals having a quite linear $dV/df$ range on each side of the center frequency.

Briefly, the present invention includes a voltage limiter having four transmission lines of the coaxial or twin line type interconnect at a junction, a square law detector and a conventional AM receiver capable of converting amplitude modulated information into intelligence. One transmission line connects the output of the limiter to the junction, another transmission line connects the junction to the square law detector and the other two transmission lines form a delay line where each transmission line has one end connected to the junction and the other ends are connected to each other. The limiter converts the incoming frequency modulated varying-amplitude signal into the same frequency modulated signal but of constant voltage amplitude. This signal is then transmitted to the junction where because of absorption and signal cancellation by the limiter, square law detector and delay line, a signal is applied to the input of the square law detector that may be described by the relationship $$\tfrac{1}{2}\sqrt{(1+\cos\omega\tau)^2+\sin^2\omega\tau}$$

where $\omega$ is the radian frequency of the input signal and $\tau$ is the combined length of the delay lines in seconds. Since the square law detector has an assumed proportionality factor of 1.0 or $V_{\text{out}}=V_{\text{in}}^2$ the output of the detector will be in the straight line portion of a cosine curve such that the output voltage varies linearly as a function of the input frequency.

An alternative technique is to form the two transmission lines into two separate delay lines of equal length where the delay lines may be either open ended or shorted.

Other objects, advantages and novel features of the invention will become apparent from the following detailed description of the invention when considered in conjunction with the accompanying drawings.

DESCRIPTION OF THE PREFERRED EMBODIMENT

Figure 1:
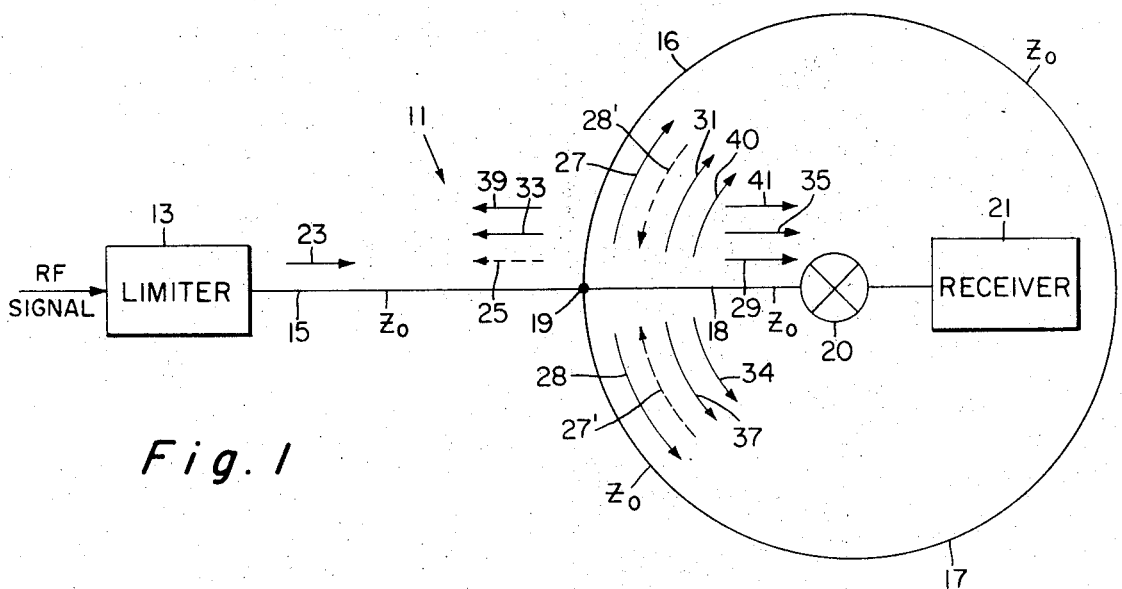
FIG. 1 is a schematic diagram of the frequency discriminator of the present invention.

In FIG. 1 is shown a schematic diagram of the frequency discriminator 11 of the present invention. This frequency discriminator includes a limiter 13, transmission lines 15, 16, 17 and 18, junction 19, square law detector 20 and a voltage processor which may be an AM receiver 21, for example. Transmission lines 16 and 17 function as a single delay line as hereinafter described. The received RF signal, that may be variable in amplitude and frequency, is applied to the input of limiter 13. The purpose of limiter 13 is to provide a constant output voltage signal independent of frequency so that it may be processed by the transmission lines and detector as hereinafter described. It is to be understood that the limiter may be unnecessary and eliminated if the incoming RF signal has a relatively constant voltage amplitude or if the voltage amplitude varies over a relatively long period of time so that it will not distort the linear conversion of the FM signal to the AM signal by detector 20. The information on the incoming RF signal, which is of the frequency modulation type, is to be demodulated and converted into meaningful voltage information by detector 20. For many applications the amplitude of the incoming RF signal varies because the transmitter may be at varying distances from the receiver, such as with transmitter carrying satellites, and because of the variations in ionosphere propagation. The output signal from limiter 13 has an assumed constant voltage of one unit at an assumed phase angle of zero and shall be referred to as $1\angle 0$. Transmission lines 15, 16, 17 and 18 are selected to have the same impedance $Z_0$ and are interconnected at junction 19. The transmission lines may be coaxial cables, twin lines or the like. The output impedance of limiter 13 is selected to have an output impedance that matches the impedance $Z_0$ of transmission line 15 and the input impedance of square law detector 20 is selected to have an input impedance that matches the impedance $Z_0$ of transmission line 18.

The operation of the circuit shown in FIG. 1 is as follows. The frequency modulated RF signal that is received at the input of limiter 13 is processed by the limiter to provide a constant voltage frequency modulated RF signal 23 that arrives at junction 19 with a voltage magnitude of 1 $\angle 0$. The impedance seen by this signal at junction 19 is $Z_0/3$. This is because transmission lines 16, 17 and 18 are in parallel and each has an impedance $Z_0$. The reflection coefficient ($\rho$) of the signal 23 therefore may be described by the relationship:

$$\rho = \frac{\frac{Z_0}{3} - Z_0}{\frac{Z_0}{3} + Z_0} = -\frac{1}{2}$$

Therefore the signal 25 (shown in dotted lines) that is reflected by the discontinuity at junction 19 is $-\frac{1}{2} \angle 0$. That is, $V_{refl} = \rho V_{in}$. Since the output impedance $Z_0$ of the limiter 13 matches the impedance $Z_0$ of line 15 the reflected signal 25 is entirely absorbed in the output of the limiter. It is to be understood that the reflected signal 25 may be absorbed by other techniques, such as by a circulator, not shown, placed in line 15. Simultaneously with the launching of reflected signal 25 a signal of $+\frac{1}{2} \angle 0 (V_{trans} = (1-\rho)V_{in})$ is launched into the other three lines 16, 17 and 18, respectively as signals 27, 28 and 29. The signal 27 is transmitted first through delay line 16 and then through delay line 17 and arrives at junction 19 as incident signal 27' with a voltage $\frac{1}{2} \angle -\omega\tau$ where $\omega$ is the radian frequency of the input signal and $\tau$ is the combined length of delay lines 16 and 17 in seconds. The signal 28 is transmitted first through delay line 17 and then through delay line 16 and arrives at junction 19 as incident signal 28' with a voltage $\frac{1}{2} \angle -\omega\tau$.

Figure 2:
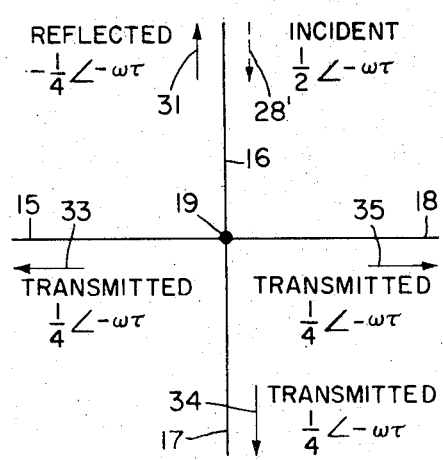
FIGS. 2 and 3 are diagrams illustrating the signals in the transmission lines during operation of the discriminator of FIG. 1.
Figure 3:
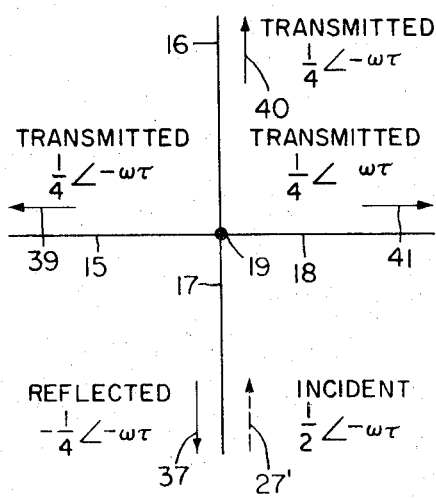

Each of incident signals 27' and 28' see a $Z_0/3$ impedance, looking into parallel lines 15, 16 and 18, and 15, 17 and 18, respectively. Therefore, a reflected signal 31 is launched from junction back through delay line 16 by reflection of signal 28' and has a voltage $-\frac{1}{4} \angle -\omega\tau$ or $[(-\frac{1}{2})\frac{1}{2} \angle \omega\tau]$. Signal 28' simultaneously launches transmitted signals 33, 34 and 35 respectively in lines 15, 17 and 18 each having a voltage $\frac{1}{4} \angle -\omega\tau$. In addition, a reflected signal 37 is launched from junction 19 back through delay line 17 by reflection of signal 27' and has a voltage $-\frac{1}{4} \angle -\omega\tau$ or $[(-\frac{1}{2})\frac{1}{2} \angle -\omega\tau]$. Signal 27' simultaneously launches transmitted signals 39, 40 and 41 respectively in lines 15, 16 and 18 each having a voltage $\frac{1}{4} \angle -\omega\tau$. From this it can be seen that reflected signals 27' and 28' simultaneously generate reflected signals 31 and 37 and transmitted signals 33, 34, 35, 39, 40 and 41 as best depicted in FIGS. 2 and 3. From this it can be seen that reflected signal 31 will be cancelled by transmitted signal 40

$$(-\tfrac{1}{4} \angle -\omega\tau + \tfrac{1}{4} \angle -\omega\tau)$$

in the delay lines and reflected signal 37 will be cancelled by transmitted signal 34 $(-\frac{1}{4} \angle -\omega\tau + \frac{1}{4} \angle -\omega\tau)$ in the delay lines. In addition, transmitted signals 33 and 39 combine to form a transmitted signal having a voltage $\frac{1}{2} \angle -\omega\tau$ that is absorbed in the limiter or a circulator. Finally, transmitted signals 35 and 41 combine to form a transmitted signal having a voltage $\frac{1}{2} \angle -\omega\tau$ that is absorbed in the detector.

Figure 4:
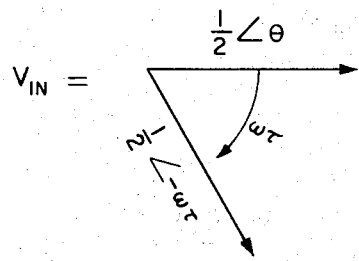
FIGS. 4 and 5 are vector diagrams showing the signal applied to the input of the square law detector of the frequency discriminator of FIG. 1.
Figure 5:
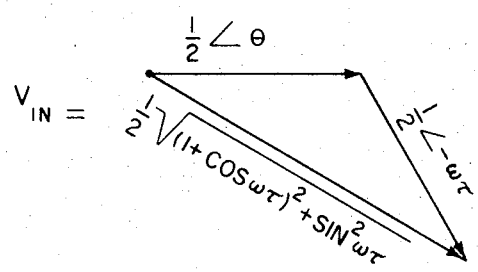

Thus, with proper termination of the output impedance of limiter 13 and the input impedance of detector 20 the voltage into the detector is:

$$V_{in} = \tfrac{1}{2} \angle 0 + \tfrac{1}{2} \angle -\omega\tau$$

where $\frac{1}{2} \angle 0$ is the original transmitted signal 29 and the signal $\frac{1}{2} \angle -\omega\tau$ is the combination of the delayed transmitted signals 35 and 41 and are shown in the diagrams of FIGS. 4 and 5.

Figure 6:
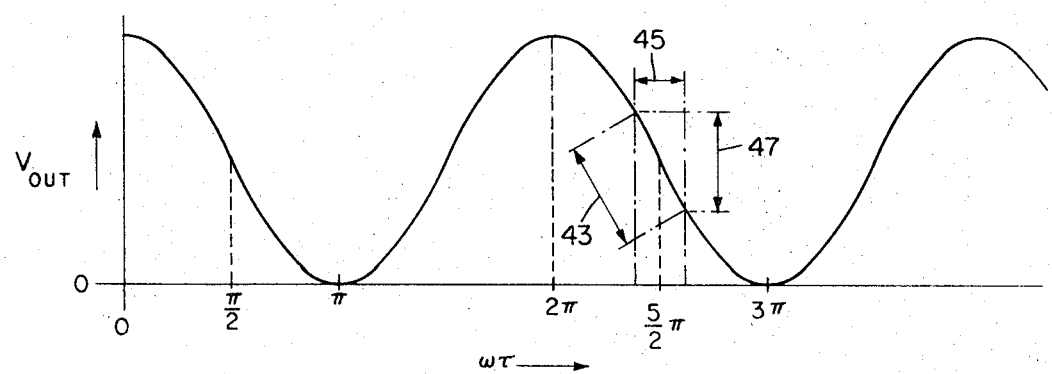
FIG. 6 is a curve illustrating the operation of the square law detector of the frequency discriminator of FIG. 1.

Detector 20 is a square law detector having an assumed proportionality factor of 1.0 or $V_{out} = V_{in}^2$. Therefore, the detector output voltage may be described by the relationship:

$$V_{out} = V_{in}^2 = (\tfrac{1}{2}\sqrt{(1+\cos \omega\tau)^2 + \sin^2 \omega\tau})^2$$
$$= \tfrac{1}{2}[1 + \cos(\omega\tau)]$$

which is shown in wave form in FIG. 6. In FIG. 6 the ordinant is $V_{out}$ and the abscissa is $\omega\tau$ and the wave form is a cosine function having a nearly straight line region as illustrated by arrow 43. Assuming that the delay line length $\tau$ is $1\mu$ second then the frequency at $2\pi$ is 1 megacycle and at $3\pi$, 1.5 megacycles. Assuming that a broad band filter is employed having a frequency range of 1.2 to 1.3 megacycles, then operation of the square law detector 20 will be in the straight line region as indicated by reference numeral 45 which will result in an output voltage ($V_{out}$) from detector 20 as indicated by reference numeral 47 that varies linearly as a function of the modulation frequency. It should be noted that the delay lines 16 and 17 may be changed in length to accommodate different frequencies. For example, the delay lines may be shortened so that $\tau$ is one nanosecond where the frequency at $2\pi$ would then be one kilomegacycle.

From the above it can be seen that the frequency discriminator of the present invention will accept frequencies over the entire bandwidth of the transmission line and square law detector and has a quite linear $dV/df$ range on each side of the discrete frequencies of $$\omega\tau = (2n+1)\frac{\pi}{2}$$

where $n = 0, 1, 2$—as shown in FIG. 6.

It is to be understood that transmission lines 16 and 17 are interconnected to form a single delay line or they may be a single continuous line. However, the principle of operation of the discriminator of the present invention is applicable to the situation where transmission lines 16 and 17 are of equal length and are not interconnected to each other except at junction 19. That is, transmisison lines 16 and 17 may be shorted or open ended and still achieve the discriminator action described when interconnected. For open ended lines with each line having a delay length $\tau/2$ the output voltage is $\frac{1}{2}[1 + \cos(\omega\tau)]$. For short circuited lines with each line having a delay length $\tau/2$ the output voltage is $\frac{1}{2}[1 - \cos(\omega\tau)]$. However, it is preferred to interconnect transmission lines 16 and 17 rather than leave them open ended or shorted because it is then unnecessary to match the lengths of the two transmission lines.

I claim:
1. A frequency discriminator comprising:
 a first transmission line for transmitting a received signal to a junction;
 a square law detector;
 a second transmission line connecting said junction to the input of said detector;
 third and fourth transmission lines;
 one end of said third transmission line being connected to said junction, one end of said fourth transmission line connected to said junction;
 said third and fourth transmission lines being delay lines for reflecting signals that are transmitted through said third and fourth transmission lines; and
 means operatively connected to said first transmission line for absorbing signals reflected from said junction.
2. The device of claim 1 wherein: each of said third and fourth transmission lines are of equal length and each of the other ends of said third and fourth lines are shorted.
3. The device of claim 1 wherein: each of said third and fourth transmission lines are of equal length and each of the other ends of said third and fourth transmission lines are open ended.
4. The device of claim 1 wherein: the other ends of said third and fourth transmission lines are interconnected.

5. The device in claim 4 wherein: said means comprises a circulator.

6. The device of claim 4 wherein: said means comprises a limiter the output of which is connected to the input of said first transmission line.

7. The device of claim 6 wherein:
the output impedance of said limiter matches the impedance of said first transmission line and the input impedance of said detector matches the impedance of said second transmission line; and
the impedance of said first, second, third and fourth transmission lines are about the same.

8. The device of claim 7 wherein: the input signal to said square law detector is defined by the relationship $\frac{1}{2}\sqrt{(1+\cos \omega\tau)^2 + \sin^2 \omega\tau}$ where $\omega$ is the radian frequency of the input signal to the detector and is the combined length of said third and fourth transmission lines in seconds.

References Cited

UNITED STATES PATENTS 2,664,505  12/1953  Berger _____ 329—116X

ROY LAKE, Primary Examiner

L. J. DAHL, Assistant Examiner

U.S. Cl. X.R.

325—445; 329—160